US012558653B2

(12) United States Patent
Webb et al.

(10) Patent No.: US 12,558,653 B2
(45) Date of Patent: Feb. 24, 2026

(54) METHOD FOR PROCESSING WASTE USING LOW-TEMPERATURE PLASMA AND DEVICE THEREFOR

(71) Applicants: Tamara Renee Webb, Chauvin, LA (US); Yuen-Li Chan, Chauvin, LA (US)

(72) Inventors: Tamara Renee Webb, Chauvin, LA (US); Yuen-Li Chan, Chauvin, LA (US)

(73) Assignee: Phoenix Waste Solutions, Inc., Chauvin, LA (US)

( * ) Notice: Subject to any disclaimer, the term of this patent is extended or adjusted under 35 U.S.C. 154(b) by 196 days.

(21) Appl. No.: 17/633,033

(22) PCT Filed: Jun. 1, 2021

(86) PCT No.: PCT/US2021/035263
§ 371 (c)(1),
(2) Date: Feb. 4, 2022

(87) PCT Pub. No.: WO2021/247587
PCT Pub. Date: Dec. 9, 2021

(65) Prior Publication Data
US 2023/0080243 A1 Mar. 16, 2023

Related U.S. Application Data

(60) Provisional application No. 63/102,207, filed on Jun. 2, 2020.

(51) Int. Cl.
*B01D 53/86* (2006.01)
*B01D 53/14* (2006.01)
(Continued)

(52) U.S. Cl.
CPC ..... *B01D 53/8681* (2013.01); *B01D 53/1456* (2013.01); *B01D 53/18* (2013.01);
(Continued)

(58) Field of Classification Search
CPC .......... B01D 2258/0291; B01D 53/864; B01D 2257/60; C01B 3/16; F23G 5/085; F23G 2204/201; B09B 3/40
See application file for complete search history.

(56) References Cited

U.S. PATENT DOCUMENTS 3,577,207 A 5/1971 Kirjushin
5,270,515 A 12/1993 Long
(Continued)

FOREIGN PATENT DOCUMENTS

CA 2651449 * 1/2008 ................ C10J 3/20
DE 4201661 * 7/1992 ............. G03F 7/094
(Continued)

OTHER PUBLICATIONS

International Search Report and Written Opinion received for PCT Application No. PCT/US2021/035263, mailed on Oct. 14, 2021, 14 pages.
(Continued)

*Primary Examiner* — Anthony J Zimmer
*Assistant Examiner* — Eric Scott Sherman
(74) *Attorney, Agent, or Firm* — WEAVER IP L.L.C.

(57) ABSTRACT

A device for processing waste is described herein that comprises an ion generator, a furnace chamber, a heat exchanger, a pollution control system, and a chimney. The ion generator converts atmospheric air into an ionized gas and the furnace chamber thermally decays the waste by combining the waste with a product of an interaction of the ionized gas and heat generated by the furnace chamber. The heat exchanger cools the excess gas. A wet scrubber system
(Continued)

removes heavy metals and/or acid gases from the cooled excess gas to generate scrubbed excess gas, and a fixed bed coke system detoxifies the scrubbed excess gas by converting carbon monoxide, water, and steam in the scrubbed excess gas to carbon dioxide and hydrogen, and removing remaining acid gas, a remaining heavy metal, and/or a remaining dioxin from the scrubbed excess gas. The chimney transfers remaining scrubbed excess gas out of the device.

8 Claims, 10 Drawing Sheets

(51) Int. Cl.

| | |
|---|---|
| *B01D 53/18* | (2006.01) |
| *B01J 8/02* | (2006.01) |
| *B01J 23/80* | (2006.01) |
| *B09B 3/40* | (2022.01) |
| *C01B 3/16* | (2006.01) |
| *F23G 5/08* | (2006.01) |
| *F23J 15/04* | (2006.01) |
| *F23J 15/06* | (2006.01) |

(52) U.S. Cl.
CPC ....... *B01D 53/864* (2013.01); *B01D 53/8665* (2013.01); *B01D 53/8668* (2013.01); *B01J 8/0278* (2013.01); *B01J 23/80* (2013.01); *B09B 3/40* (2022.01); *C01B 3/16* (2013.01); *F23G 5/085* (2013.01); *B01D 2255/20761* (2013.01); *B01D 2255/20792* (2013.01); *B01D 2255/2092* (2013.01); *B01D 2257/502* (2013.01); *B01D 2257/60* (2013.01); *B01D 2257/70* (2013.01); *B01D 2257/80* (2013.01); *B01D 2257/93* (2013.01); *B01D 2258/0291* (2013.01); *C01B 2203/0283* (2013.01); *C01B 2203/1076* (2013.01); *C01B 2203/1258* (2013.01); *F23G 2204/201* (2013.01); *F23J 15/04* (2013.01); *F23J 15/06* (2013.01)

(56) References Cited

U.S. PATENT DOCUMENTS

| | | | | |
|---|---|---|---|---|
| 5,762,009 | A | | 6/1998 | Garrison et al. |
| 9,518,733 | B1 | * | 12/2016 | Dhyllon .................... F23G 5/14 |
| 2013/0309157 | A1 | | 11/2013 | Sjostrom et al. |
| 2015/0050191 | A1 | | 2/2015 | Li et al. |
| 2018/0305205 | A1 | * | 10/2018 | Carass ...................... C01B 3/16 |
| 2022/0397269 | A1 | * | 12/2022 | Parmar ..................... B09B 3/70 |
| 2025/0032982 | A1 | | 1/2025 | Webb et al. |

FOREIGN PATENT DOCUMENTS

| | | | | |
|---|---|---|---|---|
| JP | 2008274919 | * | 11/2008 | ............ Y02T 10/12 |
| WO | WO 2001004045 | * | 1/2001 | ............ B01D 53/14 |
| WO | 2021247587 A1 | | 12/2021 | |

OTHER PUBLICATIONS

Extended European Search Report received for European Patent Application No. 21818756.5, mailed on Oct. 20, 2023, 4 pages.
International Preliminary Report on Patentability received for PCT Patent Application No. PCT/US2021/035263, mailed on Dec. 15, 2022, 10 pages.

* cited by examiner

200

400
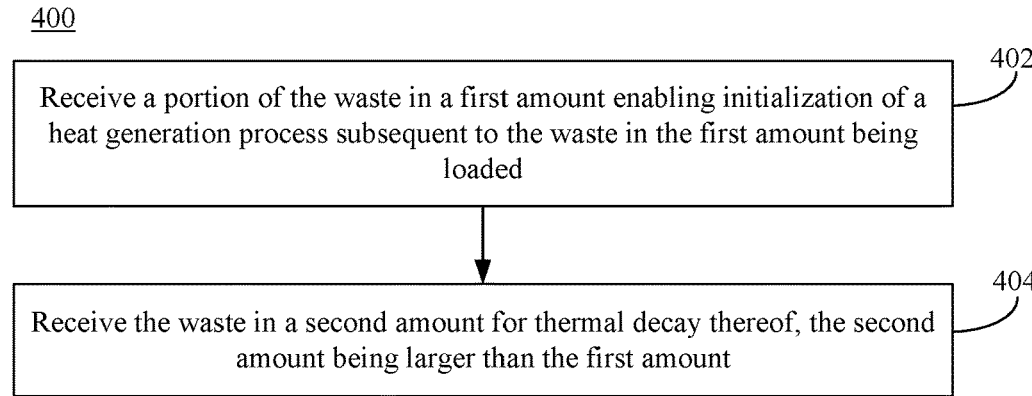
| 402 |
| Receive a portion of the waste in a first amount enabling initialization of a heat generation process subsequent to the waste in the first amount being loaded |
| 404 |
| Receive the waste in a second amount for thermal decay thereof, the second amount being larger than the first amount |
FIG. 4
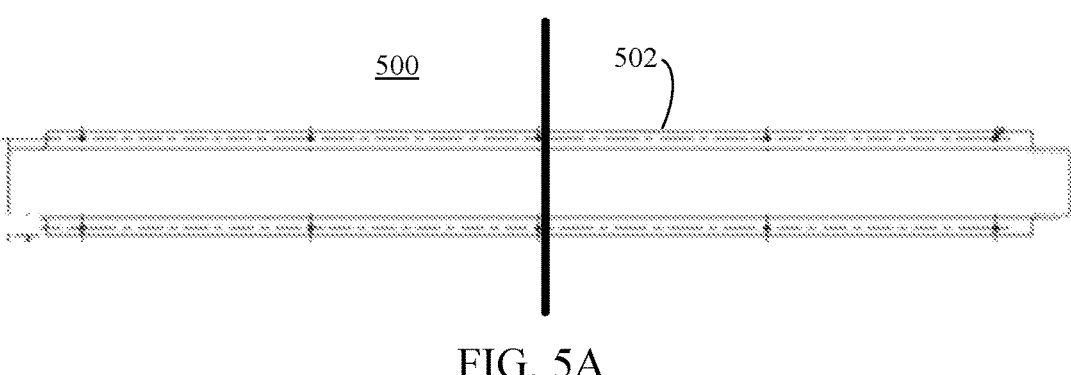
FIG. 5A
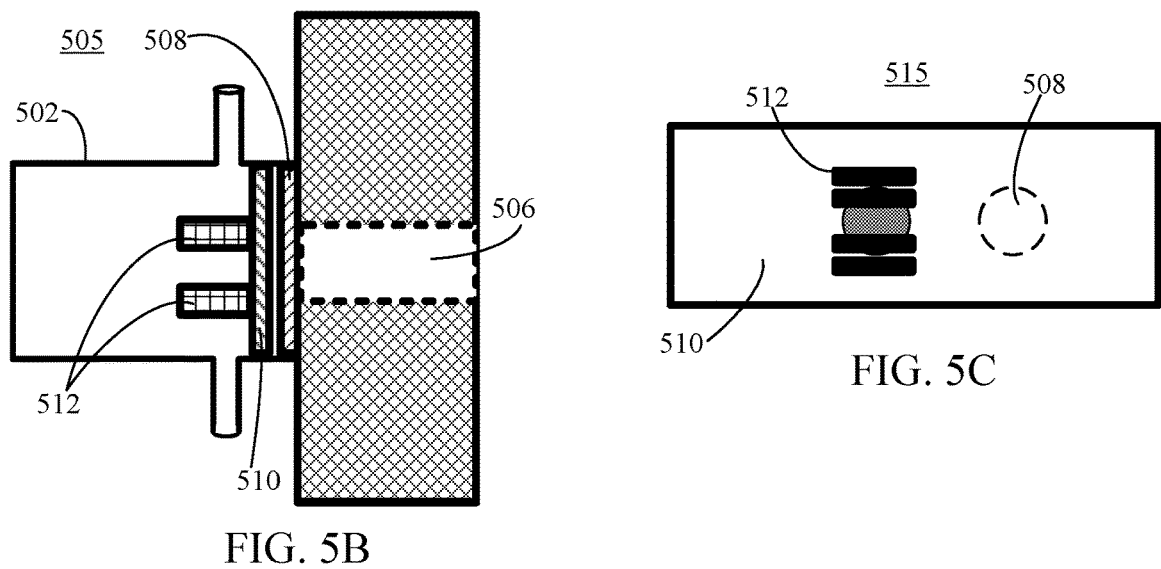
FIG. 5B
FIG. 5C

800

805

METHOD FOR PROCESSING WASTE USING LOW-TEMPERATURE PLASMA AND DEVICE THEREFOR

CROSS-REFERENCE TO RELATED APPLICATION

This application is a U.S. national phase application of PCT Application No. PCT/US2021/035263 filed on Jun. 1, 2021, and entitled "METHOD FOR PROCESSING WASTE USING LOW-TEMPERATURE PLASMA AND DEVICE THEREFOR," which claims priority to U.S. Provisional Patent Application No. 63/102,207, filed Jun. 2, 2020, and entitled "Waste processing device utilizing ionic exchange and low temperature plasma coupled with heat exchanger and pollution control system," the entirety of each of which is incorporated by reference herein.

BACKGROUND

Incineration is a waste treatment process that involves the combustion of organic substances contained in waste materials by converting the waste into ash, flue gas, and heat. The ash, which is highly toxic and must be safely disposed of, is mostly formed by the inorganic constituents of the waste and may take the form of solid lumps or particulates carried by the flue gas. The flue gases are further toxic and must be cleaned of gaseous and particulate pollutants before being dispersed into the atmosphere.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and devices are provided for enabling the processing of waste. A device for processing waste includes an ion generator, a furnace chamber, a heat exchanger, a pollution control system, and a chimney. The ion generator converts atmospheric air into an ionized gas and the furnace chamber thermally decays the waste by combining the waste with a product of an interaction of the ionized gas and heat generated by the furnace chamber, where the product comprises a low temperature plasma that inhibits the formation of one or more of a dioxin, a furan, a nitrogen oxide, and a sulfur oxide. The furnace chamber transfers excess gas of the product to the heat exchanger.

The heat exchanger cools the excess gas and transfers the cooled excess gas to the pollution control system. The pollution control system includes a wet scrubber system that removes one or more of heavy metals and acid gases from the cooled excess gas to generated scrubbed excess gas, and a fixed bed coke system that detoxifies the scrubbed excess gas by converting carbon monoxide, water, and steam in the scrubbed excess gas to carbon dioxide and hydrogen, and removing one or more of remaining acid gas, a remaining heavy metal, and a remaining dioxin from the scrubbed excess gas. The chimney transfers the remaining scrubbed excess gas that is detoxified out of the device.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 4 shows a flowchart of a method for beginning the processing of waste, according to an example embodiment.

FIG. 5A shows a detailed side view of the outer housing of the ion generator and its components described in FIGS. 3A-3B, according to an example embodiment.

FIG. 5B shows a cross section of the ion generator and its components described in FIGS. 3A-3B, according to an example embodiment.

FIG. 5C shows an orientation of magnets, according to an example embodiment.

Figure 1:
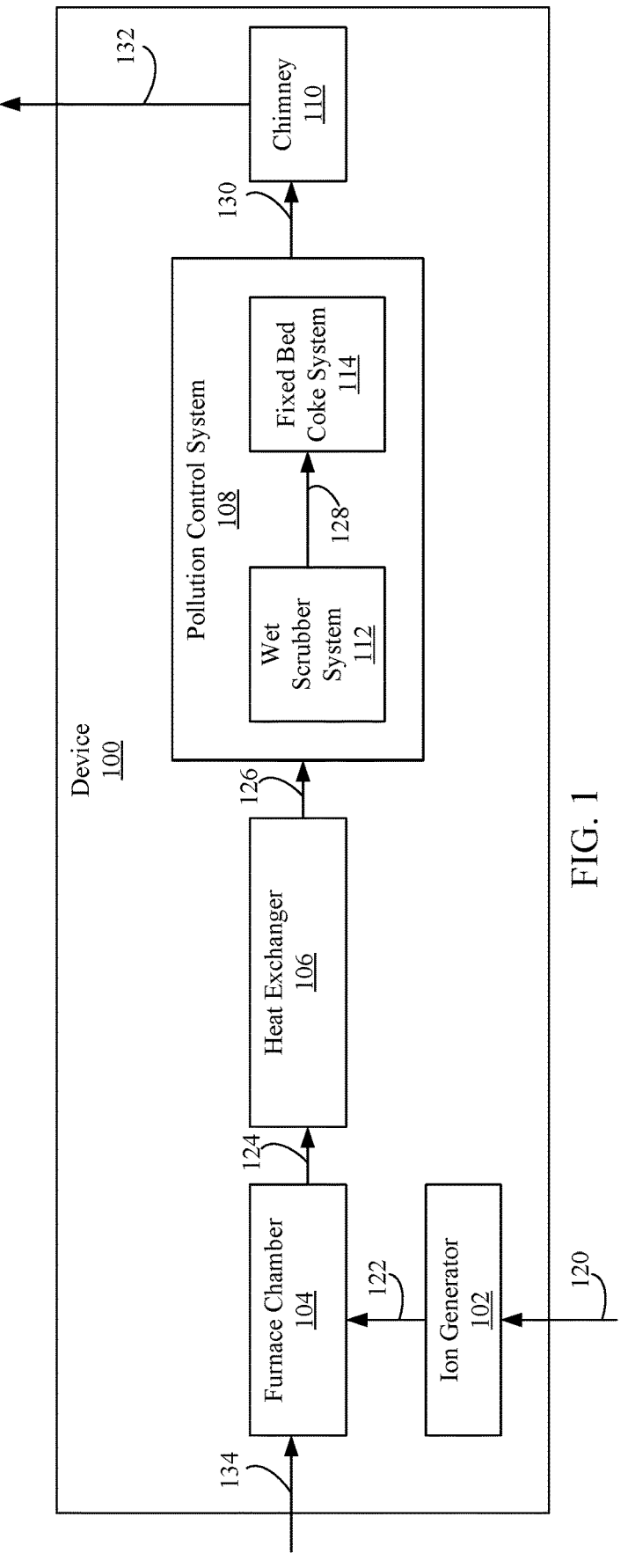
FIG. 1 shows a block diagram of a device for processing waste, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Conventional waste treatment processes involve incineration which converts waste materials into ash, flue gas, and heat. The ash, which is highly toxic and must be safely disposed of, is mostly formed by inorganic constituents of the waste and may take the form of solid lumps or particulates carried by the flue gas. The flue gases are further toxic and must be cleaned of gaseous and particulate pollutants before being dispersed into the atmosphere. In some cases, the heat that is generated by incineration can be used to generate electric power.

As such, there are concerns from experts and communities about the environmental effect of incinerators. For instance, the process of safely disposing of the highly toxic ash related to conventional incinerators usually involves additional waste lots and a special, toxic waste landfill elsewhere. When it is not disposed of safely, there is much concern from local residents. Furthermore, the health effects of dioxin and furan emissions from old incinerators continues to be an environmental problem. Still further, incinerators emit varying levels of heavy metals such as vanadium, manganese, chromium, nickel, arsenic, mercury, lead, and cadmium, which can be toxic even at extremely low levels.

Embodiments overcome these and other issues related to conventional devices for processing waste in a novel fashion. In embodiments, an ion generator utilizes one or more magnets to convert atmospheric air into an ionized gas, thereby acting as a high energy catalyst for low-temperature plasma generations and ultimately inhibiting the generation of harmful chemicals at a molecular level. In embodiments, a furnace chamber thermally decays waste by combining the waste with a low-temperature plasma that directly inhibits the formation of harmful chemicals at a molecular level. In embodiments, a heat exchanger cools exit gas to inhibit and/or remove dioxin/furan pollutants from the exit gas. In embodiments, a pollution control system removes particulate matter, heavy metals, and pollutants from the cooled exit gas to enable cleaner air emissions. In embodiments, the pollution control system further cools the cooled exit gas. In embodiments, a chimney includes a particulate matter collector to further collect any remaining particulate matter before the remaining gas leaves the device via the chimney.

Example embodiments are described as follows and are directed to techniques for processing waste. For instance, FIG. 1 shows a block diagram of a device 100 for processing waste, according to an example embodiment. As shown in FIG. 1, device 100 includes an ion generator 102, a furnace chamber 104, a heat exchanger 106, a pollution control system 108, and a chimney 110. Pollution control system 108 includes a wet scrubber system 112 and a fixed bed coke system 114. These features of device 100 are described as follows.

Ion generator 102 may represent any enclosure capable of converting atmospheric air into an ionized gas. Ion generator 102 is configured to receive and convert atmospheric air into an ionized gas to be used by device 100. For instance, and as shown in FIG. 1, ion generator 102 receives atmospheric air 120 and converts atmospheric air 120 into an ionized gas 122. Ion generator 102 may complete this conversion in various ways, discussed in detail hereinafter. In embodiments, ion generator 102 transfers ionized gas 122 to furnace chamber 104.

Furnace chamber 104 may represent any enclosed structure in which material can be heated at very high temperatures. Furnace chamber 104 is configured to thermally decay received waste by combining the waste with a product of an interaction of the ionized gas and heat generated by furnace chamber 104. In embodiments, the product includes a low temperature plasma that inhibits the formation of one or more of dioxins, furans, nitrogen oxides, and/or one of a family of sulfur oxides (e.g., sulfur dioxide compounds). For instance, and as shown in FIG. 1, furnace chamber 104 receives ionized gas 122 and waste 134 such that waste 134 can be combined with a product of ionized gas 122 and internally generated heat to thermally decay waste 134. Furnace chamber 104 is further configured to transfer excess gas of the product to the heat exchanger. For instance, furnace chamber 104 transfers excess gas 124 to heat exchanger 106.

Heat exchanger 106 may represent any structure capable of cooling the excess gas. Heat exchanger 106 is configured to cool the excess gas and transfer the cooled excess gas to the pollution control system. For instance, and as shown in FIG. 1, heat exchanger 106 receives and cools excess gas 124 and transfers cooled excess gas 126 to pollution control system 108.

Pollution control system 108, which includes wet scrubber system 112 and fixed bed coke system 114, may represent any structure capable of filtering and/or polishing the gas stream. Wet scrubber system 112 is configured to remove heavy metals and acid gasses from the cooled excess gas to generate scrubbed excess gas. In embodiments, the heavy metals may include but are not limited to mercury, lead, and cadmium and the acid gases may include but are not limited to sulfur dioxide, hydrochloric acid, and hydrogen sulfide. For instance, and as shown in FIG. 1, wet scrubber system 112 detoxifies received excess gas 126 by removing heavy metals and/or acid gases from the cooled excess gas to generated scrubbed excess gas 128. In embodiments, wet scrubber system 112 transfers scrubbed excess gas 128 to fixed bed coke system 114.

Fixed bed coke system 114 is configured to detoxify the scrubbed excess gas. For instance, and as shown in FIG. 1, fixed bed coke system 114 detoxifies received scrubbed excess gas 128. Fixed bed coke system 114 may detoxify the scrubbed excess gas in various ways. For instance, fixed bed coke system 114 may receive scrubbed excess gas 128 and convert carbon monoxide, water, and steam in scrubbed excess gas 128 to carbon dioxide and hydrogen, and remove remaining acid gas, a remaining heavy metal, and/or a remaining dioxin from scrubbed excess gas 128. In embodiments, fixed bed coke system 112 then transfers remaining scrubbed excess gas 130 to chimney 110.

Chimney 110 may represent any chimney capable of further purifying the excess gas. Chimney 110 is configured to receive the scrubbed excess gas, further purify the scrubbed excess gas, and transfer any remaining gas out of the system. For instance, chimney 110 receives remaining scrubbed excess gas 130 and transfers remaining scrubbed excess gas 132 out of device 100. Chimney 110 is configured to further purify the excess gas in various ways, discussed in detail hereinafter. These features of device 100 are discussed in more detail elsewhere herein.

Figure 2:
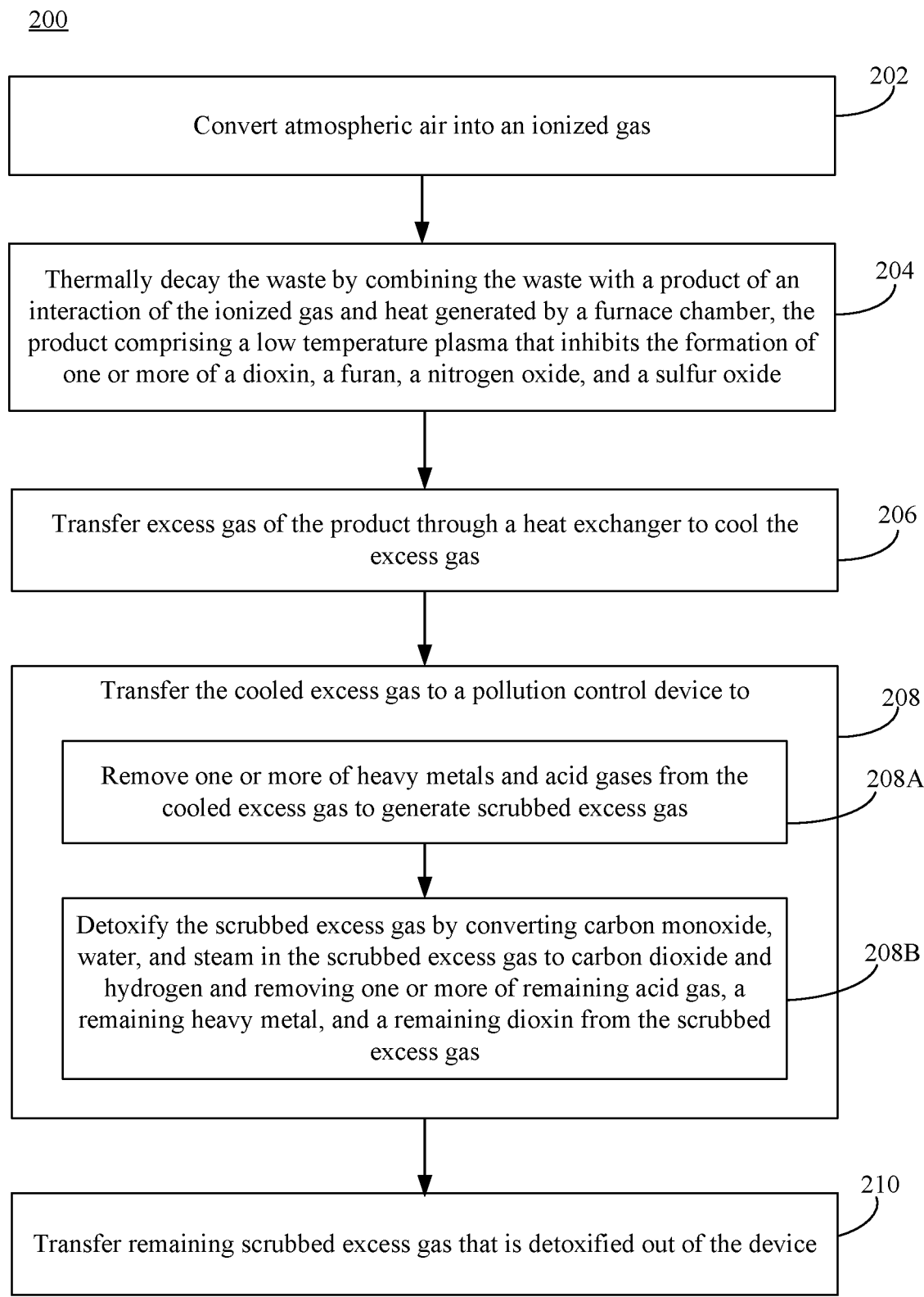
FIG. 2 shows a flowchart of a method for processing waste, according to an example embodiment.

As discussed above, and in embodiments, device 100 is configured to process waste through utilization of an ionic exchange and low-temperature plasma coupled with a heat exchanger and a pollution control system. For instance, FIG. 2 shows a flowchart 200 of a method for processing waste, according to an example embodiment. In an embodiment, flowchart 200 may be implemented by device 100. For the purposes of illustration, flowchart 200 of FIG. 2 is described as follows with continued reference to device 100 in FIG. 1. Other structural and operational embodiments will be apparent to persons skilled in the relevant art(s) based on the following discussion regarding flowchart 200 and device 100.

Flowchart 200 begins with step 202. In step 202, atmospheric air is converted into an ionized gas. For example, and with reference to FIG. 1, ion generator 102 converts received atmospheric air 120 into ionized gas 122 to transmit to furnace chamber 104. In embodiments, and discussed in greater detail hereinafter, ion generator 102 converts atmospheric air 120 into ionized gas 122 by deconstructing oxygen molecules into two ionized oxygen atoms. The oxygen is paramagnetic and oxygen atoms have two unpaired electrons which are freed in the ionizing process. This ionizing enables the provision of energy for waste decomposition and also provides for reducing flue gas toxic emissions. Ion generator 102 may be configured in various ways and may perform its functions in various ways, discussed in greater detail hereinafter.

In step 204, the waste is thermally decayed by combining the waste with a product of an interaction of the ionized gas and heat generated by a furnace chamber, the product comprising a low temperature plasma that inhibits the formation of one or more of a dioxin, a furan, a nitrogen oxide, and a sulfur oxide. For instance, with reference to FIG. 1, furnace chamber 104 thermally decays received waste 134 by combining waste 134 with a product of an interaction of ionized gas 122 and heat generated by furnace chamber 104. In embodiments, the previously mentioned unpaired electrons get concentrated as they enter furnace chamber 104 such that the heat in furnace chamber 104 further energizes the free ions and the exothermic reaction of the ionization is accelerated. The highly reactive negative ions inhibit the formation of dioxins, furans, a nitrogen oxide (NOx), and/or a sulfur oxide (SOx) through the ionic exchange. Accordingly, the pollutants that are normally associated with incineration are minimized. In embodiments, the heat is generated by furnace chamber 104 in various ways. For instance, and in an embodiment, an initial addition of energy (e.g., a flame or other form of sufficient heat) is introduced to furnace chamber 104 to begin the thermal decay process of a portion of the waste, after which the thermal decay of received waste 134 may be self-sustaining, as described above for step 204 and elsewhere herein. Alternatively, or additionally, in embodiments, electricity may power the pumps and/or blowers including photovoltaic, generators, other electrical sources (including different voltages, 110V, 220V AC), geothermal conversion, steam-to-turbine from within the system itself, etc.

In step 206, excess gas of the product is transferred through a heat exchanger to cool the excess gas. For instance, with reference to FIG. 1, excess gas 124 of the product is transferred through heat exchanger 106 to cool excess gas 124. In embodiments, the cooling of excess gas protects metallurgy of the proceeding wet scrubber system housing and baffles, and inhibits and/or removes dioxins/furan pollutants from the gas stream.

In step 208, the cooled excess gas is transferred to a pollution control system. For instance, with reference to FIG. 1, cooled excess gas 126 is transferred to pollution control system 108. In step 208A, one or more of heavy metals and acid gases are removed from the cooled excess gas to generate scrubbed excess gas. For instance, with reference to FIG. 1, wet scrubber system 112 removes heavy metals and/or acid gases from the cooled excess gas 126 to generate scrubbed excess gas 128. In embodiments, and discussed in greater detail hereinafter, wet scrubber system 112 utilizes a spray nozzle system that neutralizes acid gas and suppresses particulate matter and heavy metals into a bath solution. In further embodiments, and discussed in greater detail hereinafter, wet scrubber system 112 continues to cool cooled excess gas 126.

In step 208B, the scrubbed excess gas is detoxified by converting carbon monoxide, water, and steam in the scrubbed excess gas to carbon dioxide and hydrogen and removing one or more of remaining acid gas, a remaining heavy metal, and a remaining dioxin from the scrubbed excess gas. For instance, in FIG. 1, fixed bed coke system 114 detoxifies scrubbed excess gas 128 by converting carbon monoxide, water, and steam in scrubbed excess gas 128 to carbon dioxide and hydrogen and removing remaining acid gas, heavy metals, and/or dioxins from scrubbed excess gas 128.

In step 210, the remaining scrubbed excess gas that is detoxified is transferred out of the system. For instance, with reference to FIG. 1, chimney 110 transfers remaining scrubbed excess gas that is detoxified 132 out of device 100. In embodiments, chimney 110 further collects particulate matter from scrubbed excess gas that is detoxified 132 prior to transferring scrubbed excess gas that is detoxified 132 out of device 100.

Figure 3A:
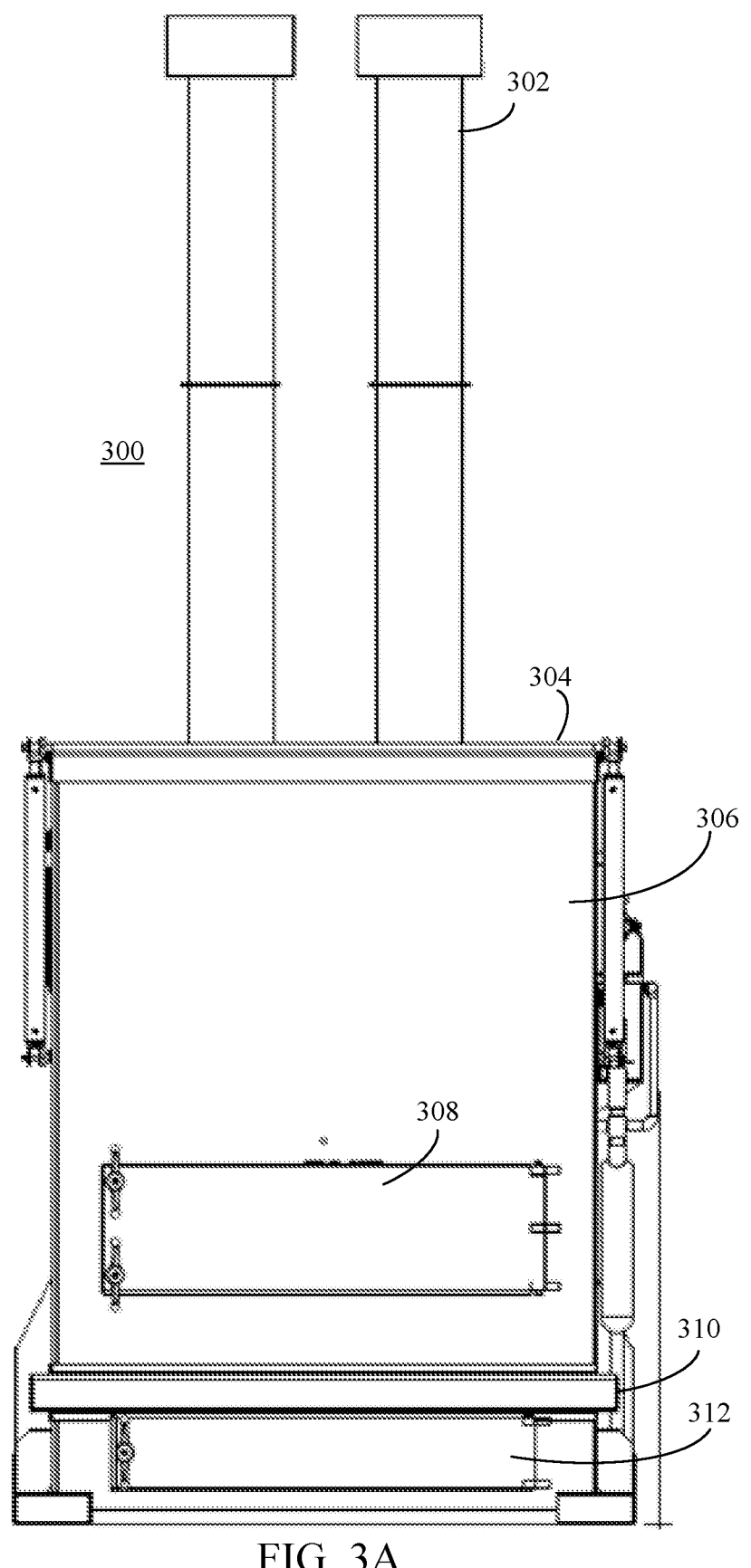
FIG. 3A shows a block diagram of a front view of a device for processing waste, according to an example embodiment.
Figure 3B:
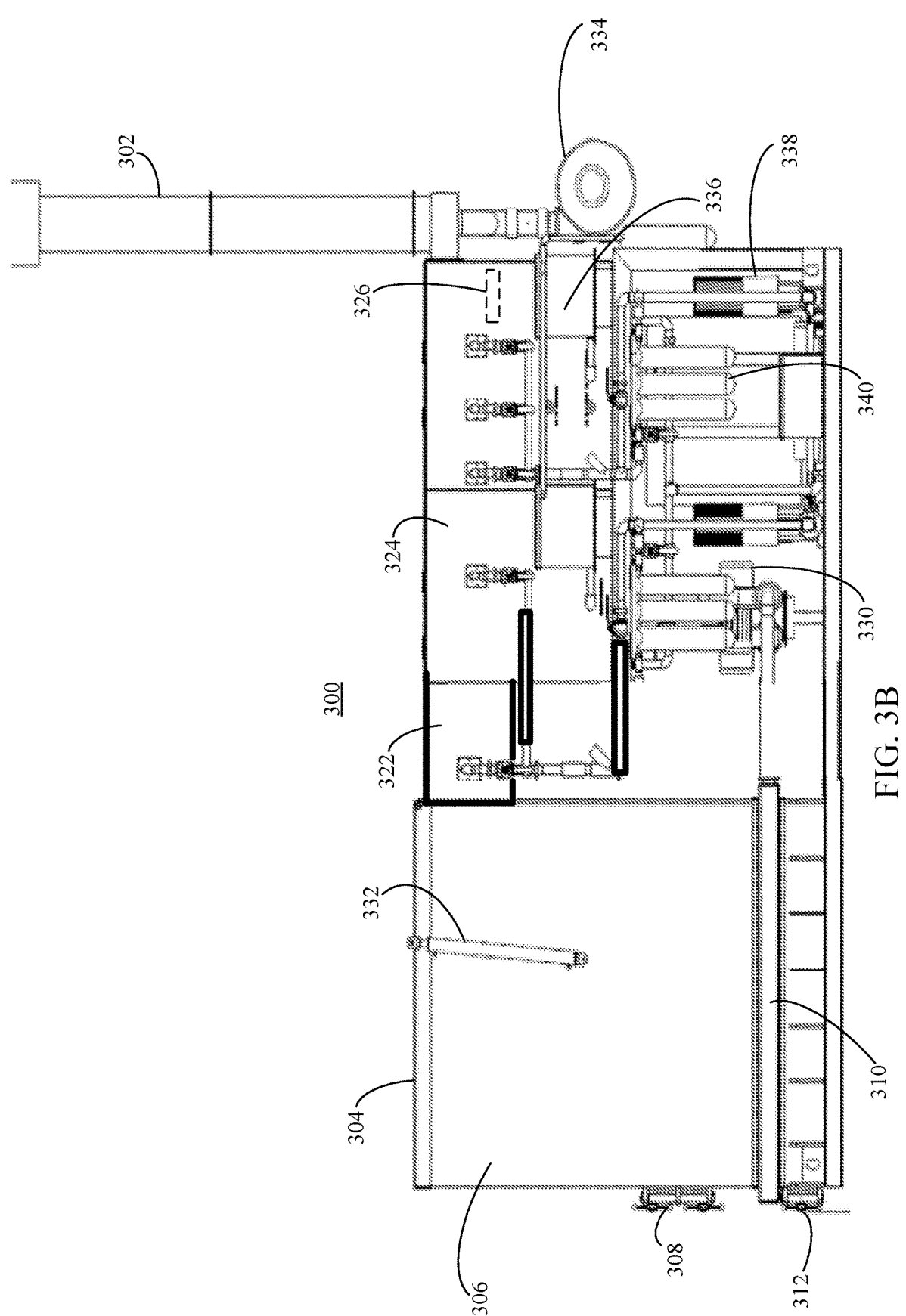
FIG. 3B shows a block diagram of a side view of a device for processing waste, according to an example embodiment.

As described above, in embodiments, device 100 is configured to process waste through utilization of an ionic exchange and low-temperature plasma coupled with a heat exchanger and a pollution control system. Device 100 may be configured in various ways, and may perform its functions in various ways. FIGS. 3A-3B are now described.

For instance, FIG. 3A shows a block diagram of a front view of device 300 for processing waste, according to an example embodiment. FIG. 3B shows a block diagram of a side view of device 300 for processing waste, according to an example embodiment. As shown in FIG. 3A, device 300 includes a chimney 302, a top waste loading door 304, a furnace chamber 306, a secondary waste access door 308, an ion generator 310, and an ash removal door 312. Further, and as shown in FIG. 3B, device 300 includes top waste loading door 304, a lifting apparatus 332, heat exchanger 322, wet scrubber system 324, fixed bed coke system 326, chimney 302, back blowers 334, water level controller 336, pumps 338, filtration system 340, ion generator 310, ash removal door 312, blowers 330, secondary waste access door 308, and furnace chamber 306.

Chimney 302 is an example of chimney 110 of FIG. 1. Fixed bed coke system 326 is an example of fixed bed coke system 114 of FIG. 1. Wet scrubber system 324 is an example of wet scrubber system 112 of FIG. 1. Heat exchanger 322 is an example of heat exchanger 106 of FIG. 1. Furnace chamber 306 is an example of furnace chamber 104 in FIG. 1. Ion generator 310 is an example of ion generator 102 in FIG. 1. Other structural and operational embodiments will be apparent to persons skilled in the relevant art(s) based on the following discussion regarding device 300.

As described above, an ion generator receives atmospheric air. Ion generators may achieve this in various ways and have various configurations herein. In embodiments, the ion generator includes an enclosure that is adjacent to the base of the furnace chamber. As shown in FIG. 3B, ion generator 310 includes an enclosure that is adjacent to the base of furnace chamber 306. The atmospheric air may be received and driven in various ways. In embodiments, blowers 330 drive the atmospheric air into and around ion generator 310. In embodiments, blowers 330 may include one or more blowers that are connected to ion generator 310 via one or more pipes such that the atmospheric air is driven through the one or more pipes and into the ion generator. For instance, and with continued reference to FIG. 3B, blowers 330 drive the atmospheric air through the one or more pipes and into the enclosure of ion generator 310. In further embodiments, the atmospheric air is controlled through a variable frequency drive controller and runs circumferentially around the base of furnace chamber 306 and through ion generator 310.

As noted above, once the ion generator receives the atmospheric air, the ion generator converts the atmospheric air into ionized gas to be transferred to furnace chamber 306, discussed in greater detail hereinafter. Furnace chamber 306 receives waste and thermally decays the waste by combining the waste with a product of an interaction of the ionized gas and heat generated by furnace chamber 306, where the product comprises a low-temperature plasma that inhibits the formation of one or more of dioxins, a furan, a nitrogen oxide, and a sulfur oxide. Furnace chamber 306 may accomplish this in various ways and have various configurations. For instance, FIG. 4 shows a flowchart 400 of a method for beginning the processing of waste. For the purposes of illustration, flowchart 400 of FIG. 4 is described with respect to FIG. 3B.

Flowchart 400 begins with step 402. In step 402, a portion of waste is received in a first amount enabling initialization of a heat generation process subsequent to the waste in the first amount being loaded. For instance, with reference to FIG. 3B, furnace chamber 306 is rectangular in shape and is loaded with waste via secondary waste access door 308 to initialize an initial lighting which starts the heat generation process. In embodiments, when the ionized gas enters furnace chamber 306 via the one or more pipes, secondary waste access door 308 is sealed to create a low oxygen environment within furnace chamber 306. As the waste is thermally decayed, the temperature rises and at, e.g., approximately 400 degrees F. and greater, an ideal ionic gas state is achieved with maximum energy and exothermic reaction of the charged ions. In embodiments, the heat is absorbed and stored within insulating layers of furnace chamber 306 to provide a heat source feedback to successive waste batches. In this way, there is zero external fuel used in the post-initial process and no secondary heating required to control toxins. In embodiments, and as shown in FIG. 3B, secondary waste access door 308 is located proximate to the base of furnace chamber 306.

In step 404, additional waste is received in a second amount for thermal decay thereof, the second amount being larger than the first amount. For instance, with reference to FIG. 3B, top waste loading door 304 of furnace chamber 306 is loaded with each successive waste load for thermal decay thereof. In embodiments, the internal frame is made of high-quality stainless steel, such as martensitic steel, to provide protection for furnace chamber 306. In embodiments, and due to the significant weight of top waste loading door 304, top waste loading door 304 may require lifting apparatus 332, such as actuated rams or a chain hoist, to open and close top waste loading door 304. In embodiments, as the waste is thermally decayed it produces a solid byproduct ash which is captured in the ash collection trays and is removed via an ash removal door. For instance, and with reference to FIGS. 3A and 3B, ash removal door 312 captures ash in collection trays such that it can be removed thereafter. In embodiments, the ash could be used for varying purposes, such as organic charcoal or bio char.

As noted above, once the waste is thermally decayed, excess gas of the product is transferred out of the furnace chamber and into a heat exchanger to be cooled, discussed in greater detail hereinafter. For instance, with reference to FIG. 3B, excess gas of the product is transferred out of furnace chamber 306 and into heat exchanger 322 to be cooled. In embodiments, a rapid cooling inhibits and/or removes dioxin and/or furan pollutants from the gas stream. Following the cooling of the excess gas, and as noted above, the cooled excess gas is transferred from the heat exchanger into the wet scrubber system of an air pollution control system to generate scrubbed excess gas, discussed in greater detail hereinafter. For instance, with reference to FIG. 3B, cooled excess gas is transferred to wet scrubber system 324 and filtration system 340 for scrubbing. In embodiments, the base of wet scrubber system 324 includes a high alkaline absorbent solution bath that piping and pumps 338 intake from the base of the alkaline bath and pump into a spray nozzle positioned along piping at the top of the down baffle. In embodiments, the water level of the bath is controlled via electrical water level control 336. In embodiments, back blowers 334 feed various aspects of device 300 such as chimney 302, filtration system 340, and pumps 338.

Following the scrubbing of the excess gas, and as noted above, the scrubbed excess gas is transferred from the wet scrubber to the fixed bed coke system of air pollution control system to detoxify the scrubbed excess gas, discussed in greater detail hereinafter. For instance, with reference to FIG. 3B, scrubbed excess gas is transferred from wet scrubber system 324 to fixed bed coke system 326 for detoxification. As noted above, the remaining detoxified scrubbed gas is transferred out of the device. For instance, with reference to FIG. 3B, the remaining detoxified scrubbed gas is transferred out of device 100 via chimney 302.

As noted above, ion generator 102 of FIG. 1 and/or ion generator 310 of FIGS. 3A and 3B are configured to convert atmospheric air to ionized gas by utilizing one or more magnets. To accomplish this, an ion generator as described herein may be configured in various ways. For instance, FIG. 5A shows a detailed side view 500 of the outer housing of the ion generator and its components, FIG. 5B depicts a cross section 505 of ion generator and its components, and FIG. 5C shows an orientation 515 of magnets, according to example embodiments. For the purposes of illustration, FIG. 5A, FIG. 5B, and FIG. 5C will be discussed with continued reference to FIG. 3B. As shown in FIG. 5A, side view 500 includes an outer housing 502. As shown in FIG. 5B, cross section 505 includes outer housing 502, furnace piping 506, an inner sliding plate 508, an outer sliding plate 510, and magnet retention devices 512. As shown in FIG. 5C, orientation 515 includes outer sliding plate 510, magnet retention device 512, and inner sliding plate 508. These and other features of side view 500, cross section 505, and orientation 515 are described as follows.

In embodiments, outer housing 502 of ion generator is affixed to the base of furnace chamber 306. In embodiments, inner sliding plate 508 and outer sliding plate 510 each may have respective, predetermined hole patterns. In embodiments, outer sliding plate 510 may include one or more magnet retention devices 512 positioned across the predetermined hole pattern(s). In embodiments, and as shown in FIG. 5B, magnet retention devices 512 are affixed to outer sliding plate 510 to align with furnace piping 506. In embodiments, magnet retention devices 512 may be configured to hold one or more magnets and to maintain a spacing between the one or more magnets. For instance, magnet retention devices 512 are configured to position magnets without applying heat near the magnets. In embodiments, inner sliding plate 508 is configured to move independently with respect to outer sliding plate 510 via a slide mechanism. In this way, inner sliding plate 508 may move within a channel and can be opened and closed to isolate the ion generator and specifically the magnets from the furnace chamber to prevent excessive heat reaching magnets and backflow into the ion generator, and the magnets themselves are physically decoupled from the furnace chamber and piping to provide additional protection against overheating through conductive heat transfer.

In embodiments, one or more magnets create a magnetic field for the atmospheric air to pass through. The one or more magnets may be capable of achieving a high Curie temperature rating as well as magnetic pull strength. In embodiments, the one or more magnets may be samarium cobalt magnets. In embodiments, the one or more magnets are stacked and arranged to provide the maximum flux density, allowing for an amplified magnetic flux. In embodiments, a minimum of 2 or more rectangular ⅜" wide or greater magnets are stacked such that the north and south poles face each other with no spacing. In embodiments, the upper set of magnets and the bottom set of magnets have the same configuration. For instance, in embodiments, two sets of stack magnets are arranged such that a north pole of the upper stack is positioned within ½" or less from the bottom stack with the bottom stack south pole facing the upper stack north pole. In embodiments, the magnetic flux is greater than 500 Gauss. This magnetic flux strength enables the deconstruction of the oxygen molecule into ionized oxygen atoms.

As noted above, the ionized gas containing the deconstructed oxygen atoms uniquely inhibits the formation of complex pollutant molecule chain interactions. Oxygen molecules are no longer available to pair with other elements like sulfur and chorines which are key components in air pollutants such as dioxin, furans, sulfur dioxides and other pollutant compounds.

Figure 6:
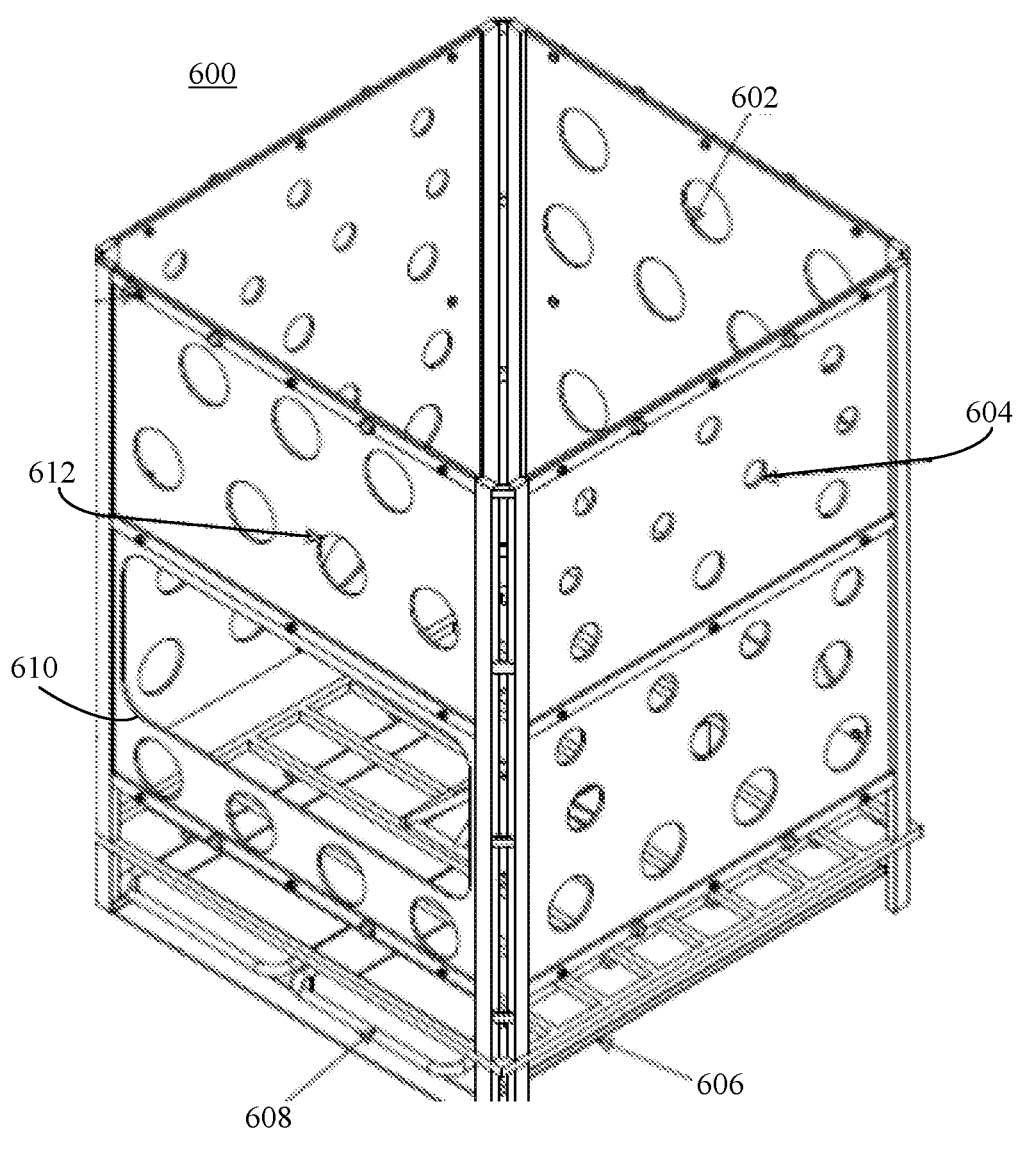
FIG. 6 shows a detailed view of the internal frame of the furnace chamber described in FIGS. 3A-3B, according to an example embodiment.

As discussed above, blowers drive the atmospheric air through the ion generator and into the furnace chamber. FIG. 6 depicts a detailed view of the internal frame 600 of furnace chamber. As shown in FIG. 6, internal frame 600 includes stainless steel plates with air flow pattern 602, stainless steel plates with air flow pattern 604, waste base frame 606, ash trays 608, ash door 610, and air flow holes 612. These features of internal frame 600 are described as follows.

In embodiments, the base of the frame supports the waste upon loading and provides a compartment for ash collection below. As shown in FIG. 6, waste base frame 606 supports the waste upon loading and provides ash trays 608 for ash collection. In embodiments, a circulatory path for the ionic gas is achieved via an air flow pattern cut into the frames of side plates. For instance, and as shown in FIG. 6, stainless steel plates with air flow pattern 602, 604 and air flow holes 612 create a circulatory path for the ionic gas. In embodiments, as the waste is processed, it produces solid byproduct ash which is collected by ash trays 608 and is transferred with unprocessed metal, glass debris, and/or the like, to ash door 610. For instance, and as shown in FIG. 6, ash is captured and removed via ash trays 608 and unprocessed debris is captured and removed via ash door 610.

Figure 7:
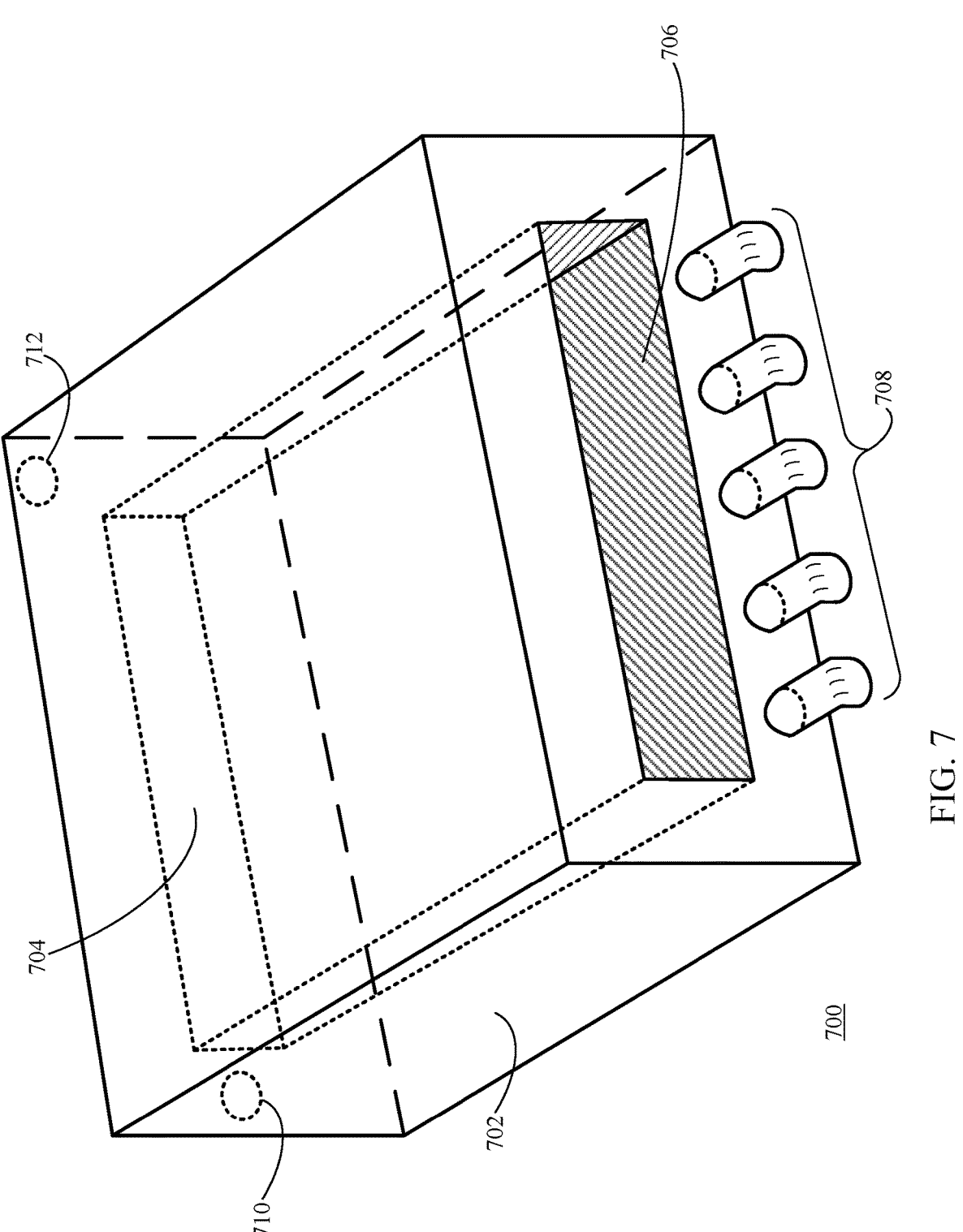
FIG. 7 shows a heat exchanger as in FIGS. 3A-3B, according to an example embodiment.

As noted above, as the waste is thermally decayed, excess gas exits the furnace via a rectangular gas exit into a heat exchanger. For instance, FIG. 7 shows an example heat exchanger 700, according to an example embodiment. As shown in FIG. 7, heat exchanger 700 includes a water bath 702, a gas entrance 704, a gas exit 706, elbows 708, a water inlet 710, and a high heat/steam connection 712. These and other features of heat exchanger 700 are described as follows.

In embodiments, the excess gas exits the furnace chamber via a rectangular flue gas exit and into a heat exchanger box. For instance, and with reference to FIG. 7, the excess gas enters heat exchanger box 700 via gas entrance 704. In embodiments, the heat exchanger box provides cooling to the excess gas via a water bath located between an inner and outer box. For instance, and with reference to FIG. 7, water is pumped into the box via water inlet 710 located proximate to water bath 702 and passes through to constantly cool the excess gas. The cooling of the excess gas protects metallurgy of wet scrubber housing and baffles. In embodiments, the water exits the heat exchanger through a series of spray nozzles which form the first stage of the wet scrubber suppression. For instance, and with reference to FIG. 7, the water exits heat exchanger 700 with 90-degree elbows 708.

In embodiments, rapid cooling of excess gas also inhibits and removes dioxins/furan pollutants from the excess gas as an initial step in heat exchanger 106 of FIG. 1 and/or heat exchanger 322 of FIGS. 3A and 3B. In further embodiments, the heat exchanger provides a source for high heat/steam connection 712 for electrical generation capacity which may be adapted to the access point to generate electrical power to sustainably provide an electrical source from the waste stream. In embodiments, the cooled excess gas exits the heat exchanger into wet scrubber system of pollution control system. For instance, and with reference to FIG. 7, cooled excess gas exits heat exchanger 700 via gas exit 706.

Figure 8A:
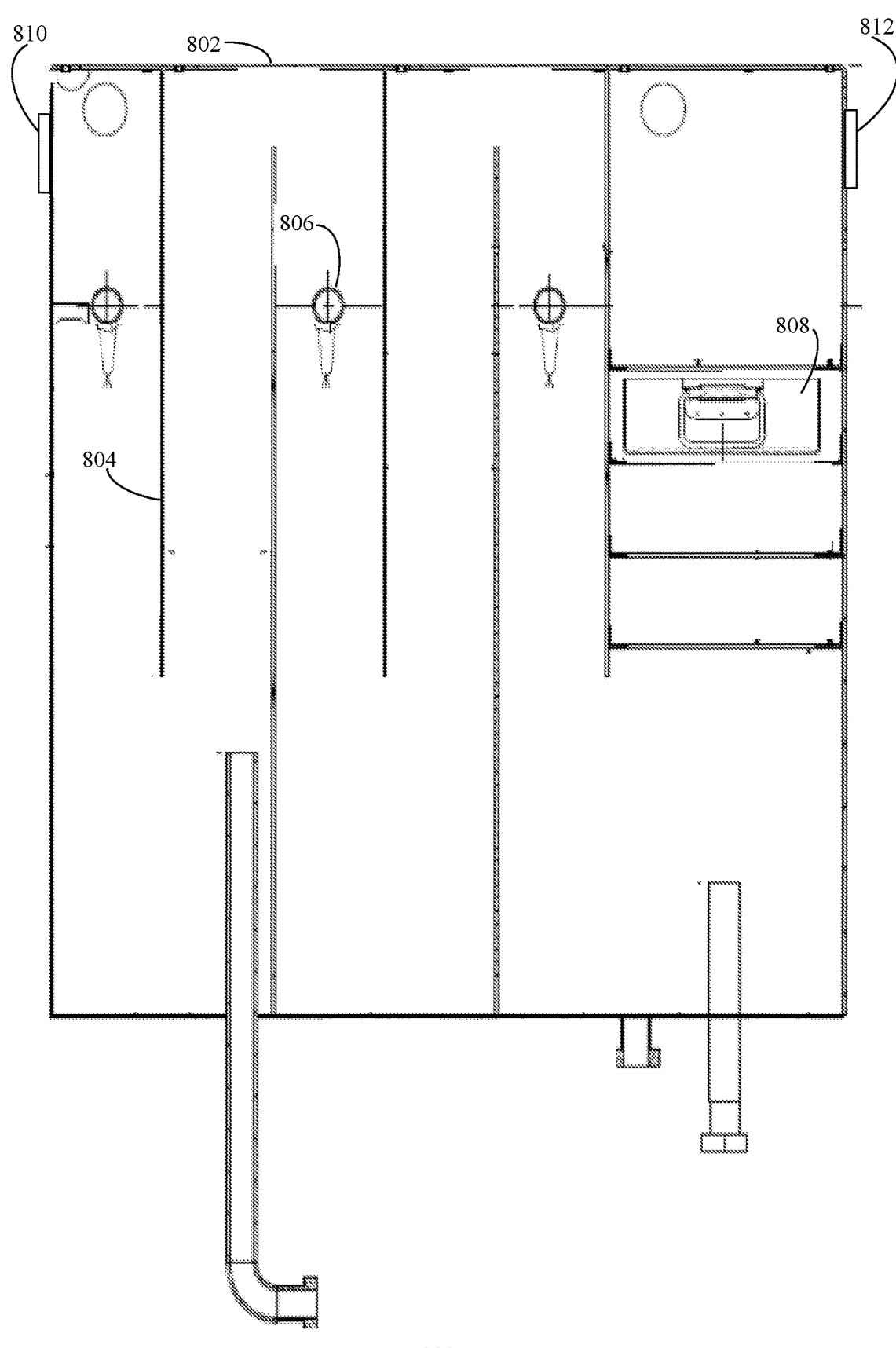
FIG. 8A shows a cross section of pollution control system as in FIG. 1, according to an example embodiment.
Figure 8B:
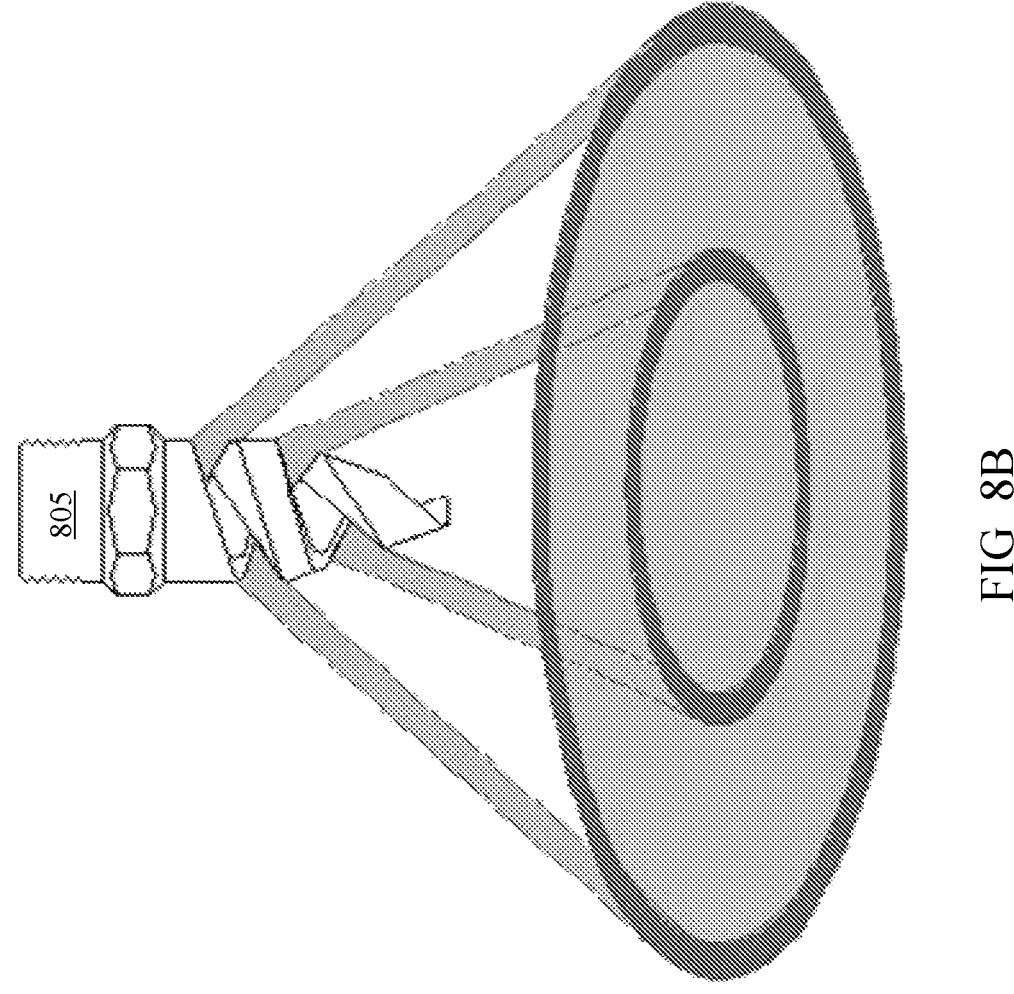
FIG. 8B shows a spray nozzle, according to an example embodiment.

As noted above, cooled excess gas enters a pollution control system to be further polished. As further noted above, such a pollution control system may include a wet scrubber system portion and subsequently a fixed bed coke system portion. A wet scrubber system and a fixed bed coke system may be configured in various ways, in embodiments. For instance, FIG. 8A shows a cross section of a pollution control system 800, according to an example embodiment. Pollution control system 800 (also "system 800" herein) is an embodiment of pollution control system 108. As shown in FIG. 8A, system 800 includes scrubber housing 802, baffle plates 804 and spray nozzles and piping 806, which may comprise a wet scrubber portion of system 800, and a fixed bed shelfing and tray 808, an inlet 810, and an output outlet 812 which may comprise a fixed bed coke tray portion of system 800. FIG. 8B is an embodiment of FIG. 8A and shows a spray nozzle 805, according to an example embodiment, which may be a spray nozzle of spray nozzles and piping 806 in FIG. 8A. These and other features of FIGS. 8A and 8B are discussed as follows.

In embodiments, the wet scrubber portion of system 800 includes a series of stages in which a single stage respectively comprises up and down configurations of baffle plates 804, and spray nozzles and piping 806. For instance, and as shown in FIG. 8A, the wet scrubber portion of system 800 includes a series of stages of baffle plates 804 and spray nozzles and piping 806 enclosed by scrubber housing 802. In embodiments, the series of stages may be any number of stages that includes any number of baffle plates 804 and/or spray nozzles and piping 806. In embodiments, the wet scrubber portion contains an alkaline absorbent water bath in the base of scrubber housing 802, where pumps pull the absorbent fluid from the base of the water bath and provide the alkaline absorbent into spray nozzles and piping 806. In embodiments, the spray nozzles of spray nozzles and piping 806 may be specifically designed and/or configured to minimize spray droplet size in an enhanced double cone spray pattern to maximize contact with the gas stream subsequent to its entry into system 800 via inlet 810. For example, and as shown in FIG. 8B, spray nozzle 805 is specifically designed/configured to maximize such contact with the gas stream.

In embodiments, and as noted above, wet scrubber portion of system 800 continues to cool the cooled excess gas. For instance, and as shown in FIG. 8A, as the cooled excess gas continues through the path of spray nozzles and piping 806 and baffle plates 804, the cooled excess gas is further cooled. In embodiments, the cooled excess gas is cooled between 600-700 degrees F.

In embodiments, and as shown in FIG. 8B, the fluid impacts the shown helical shape and shears into droplets in a multiple, hollow-cone pattern to provide a full contact cone pattern. In embodiments, the absorbent is a high pH alkaline chemical or combination of chemicals that neutralizes the acid gases such as sulfur dioxide, hydrochloric, hydrogen sulfide, and others to remove such acid gases permanently from the gas stream. In this way, the spray further suppresses and contacts the particulate matter within the gas stream to knock out the matter within the gas stream into the water bath. Additionally, heavy metals such as mercury, lead, and cadmium attach themselves to the particulate matter and are suppressed into the water bath with other matter. In embodiments, the wet scrubber portion of system 800 may be, or may comprise portions thereof that are, a closed loop system(s). Accordingly, a cleaning system portion of system 800 is also contemplated herein that is configured to filter the particulate matter from the absorbent water bath. At the base of the water scrubber nozzles, such as educator nozzles, are utilized to keep solid particulate in suspension enabling the cleaning system to clean the absorbent water by collecting and filtering the particulate matter therefrom. Thus, in performance of such cleaning, embodiments provide for a filtering portion of the cleaning system which may include, without limitation, one or more: pumps, eductor nozzles, piping, centrifuges, cartridge filters, bag filters, and/or sock filters. A weir(s) may be utilized, e.g., in one or more of baffle plates 804 to separate the clean portion of the tank and the dirty portion of tank so that clean fluid is pumped back into the clean portion which is the suction side of the separate pumping system focused on suppressing the particulate matter. The water bath is thus recirculated through the pumping system, such as pumps 338 of FIG. 3B, and through the filtering system, such as filtration system 340 of FIG. 3B, which removes solid matter from the absorbent bath and allows a closed loop wet scrubber process. In embodiments, the water level is controlled via an electrical water level controller, such as water level controller 336 of FIG. 1, which maintains the prescribed water level and thus enables an optimized, stable pressure drop and flow path within the wet scrubber portion of system 800.

As noted above, the scrubbed excess gas exits the wet scrubber portion of system 800 and enters the fixed bed coke tray system portion of system 800. For instance, and as shown in FIG. 8A, in the flow of system 800, fixed bed shelfing and tray 808 follows the wet scrubber portion. In embodiments, the fixed bed shelfing and tray 808 may include multiple types of pelletized activated carbons specifically formulated to polish remaining contaminants such as acid gas, heavy metals, and dioxin/furans. In embodiments, a first tray of fixed bed shelfing and tray 808 may include a Copper Oxide, Zinc Oxide, and/or Aluminum Oxide pelletized catalyst(s) to enable a low-temperature water gas shift process. The copper, zinc, and/or aluminum oxides work at low temperatures, e.g., between 200° F. to 400° F., to convert carbon monoxide and water (e.g., as steam) to carbon dioxide and hydrogen. This is represented in the following chemical formula:

$$CO + H_2O \rightleftharpoons CO_2 + H_2 \qquad \text{(Formula 1)}$$

In the thermal processing and deconstruction of the oxygen molecule to oxygen atoms the byproduct of carbon monoxide is formed and requires special treatment. The low temperature water gas shift induced by the Copper Oxide, Zinc Oxide, and/or Aluminum Oxide pelletized catalyst(s) enables the removal of unwanted carbon monoxide from flue gas emissions. In embodiments, this process works in the temperature range of 200 to 400 degrees Fahrenheit such that the Copper Oxide, Zinc Oxide, and/or Aluminum Oxide pelletized catalyst(s) is placed in fixed bed shelfing and tray 808 at this temperature range. The remaining gas exits system 800, subsequent to polishing/processing via fixed bed shelfing and tray 808, by output outlet 812 into the base of a chimney, as described in further detail below.

Figure 9:
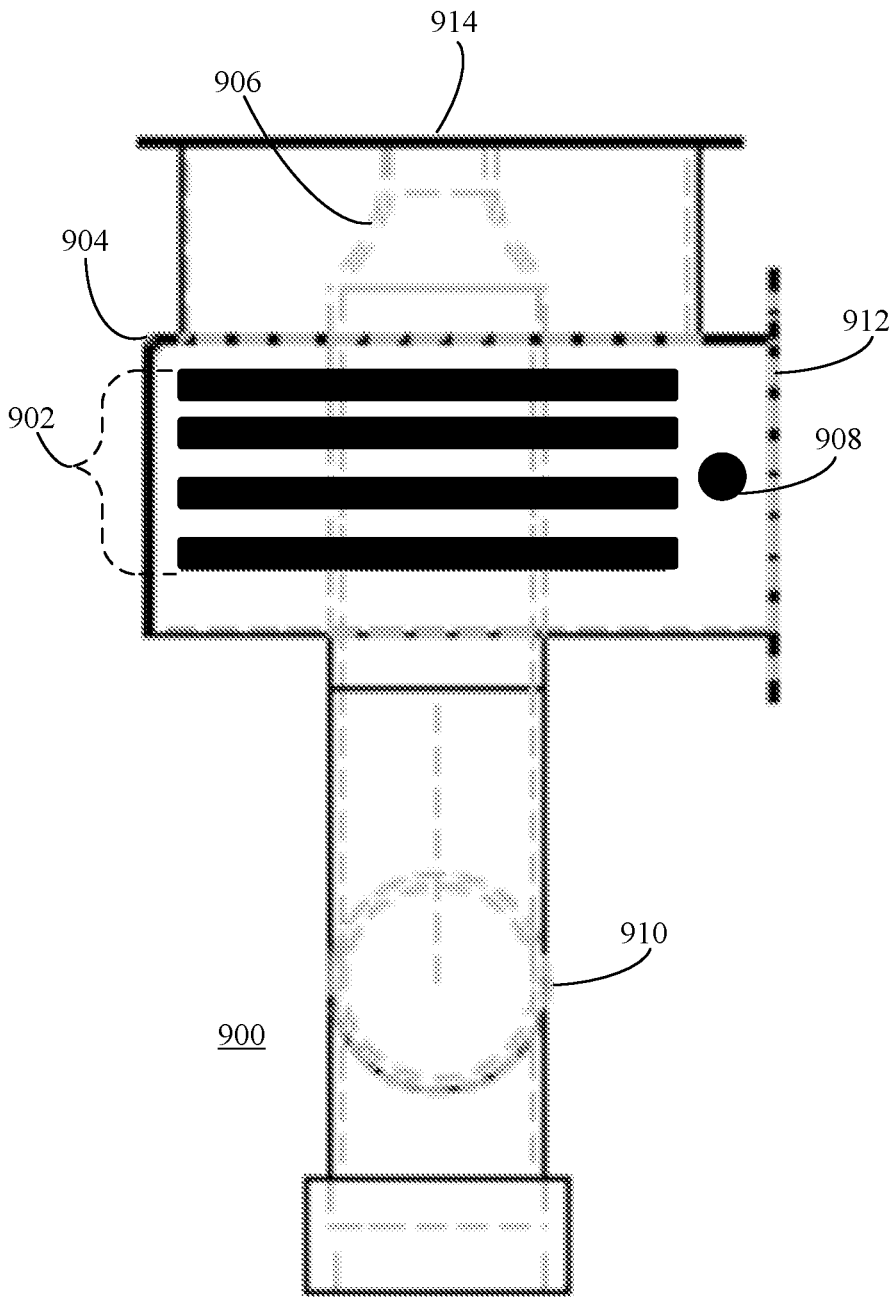
FIG. 9 shows a chimney as in FIGS. 3A-3B, according to an example embodiment.

For instance, FIG. 9 shows a chimney 900, according to an example embodiment. As shown in FIG. 9, chimney 900 includes positively charged plates 902, plate removal door 904, venturi orifice 906, an electrode 908, blower piping 910, a chimney intake 912, and an exit 914. These and other features of chimney 900 will be described as follows.

In embodiments, a voltage of 208 volts, e.g., or a higher voltage, in embodiments, may be applied to negatively charge electrode 908 and as flue gas particles, which enter chimney 900 at its base via chimney intake 912 from pollution control system 800 of FIG. 8A, pass negatively charged electrode 908 the particles become negatively charged, although lower voltages are also contemplated herein. For instance, and as shown in FIG. 9, as excess gas particles pass negatively charged electrode 908, the particles become negatively charged. The charged matter moves along positively charged plates 902, and the negatively charged matter is attracted to positively charged plates 902 and is collected along the surfaces of positively charged plates 902. For instance, as in FIG. 9, the charged matter moves along positively charged plates 902 and the negatively charged matter is attracted to positively charged plates 902, collecting along the surfaces thereof. In embodiments, positively charged plates 902 are periodically removed through plate removal door 904 for cleaning and/or replacement. Through the process described above with respect to chimney 900, the remaining, scrubbed excess gas is further purified.

In embodiments, a blower, such as back blower 334 of FIG. 3B, mounted below chimney 900 is piped to the venturi orifice 906 such that the venturi orifice 906 induces a suction/draft into chimney exit 914 pulling the exhaust gas through the air pollution control system, such as pollution control system 800 of FIG. 8A, and through exit 914. For instance, and as shown in FIG. 9, blower piping 910 enables the piping to venturi orifice 906 to induce suction/draft to pull the remaining scrubbed excess gas that is detoxified through exit 914. In embodiments, the blower speed is adjusted via a variable frequency speed controller to optimize flue gas emission conditions.

In embodiments, the device 100 includes a clean section and a dirty section such that the device removes material from dirty fluid in the dirty section through a centrifuge inline bag filter and returns cleaned fluid back to the clean section. In embodiments, the device includes a double door for loading such that the inside of the device is not exposed to the outside world, e.g., during operations for processing waste, as described herein. In embodiments, the device may be continuously loaded during operation, substantially continuously loaded, or configured for continuous loading, such as through use of a conveyor belt that provides waste to be processed to the furnace chamber. In embodiments, the stream of the device is fed back into the system to generate electricity to run the device and corresponding components. In embodiments, the device generates organic charcoal, as an output, which can be reused.

IV. Additional Exemplary Embodiments

As described, systems and devices embodying the techniques herein may be configured and enabled in various ways to perform their respective functions for processing waste using low-temperature plasma. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations. As described herein, systems, devices, components, etc., of the embodiments that are configured to perform functions and/or operations are also contemplated as performing such functions and/or operations. Furthermore, illustrated and described embodiments herein may include additional or fewer component/subcomponents than shown or enumerated, and in embodiments, some components may be combined, or may be separate, and may vary from examples specifically noted herein. Additionally, while embodiments include some specific descriptions for frame and structure materials, other materials are contemplated herein. The additional examples and embodiments described in this Section may be applicable to examples disclosed in any other Section or subsection of this disclosure.

A device for processing waste is described herein. The device comprises an ion generator, a furnace chamber, a heat exchanger, a pollution control system, and a chimney. The ion generator is configured to convert atmospheric air into an ionized gas, and the furnace chamber configured to thermally decay the waste by combining the waste with a product of an interaction of the ionized gas and heat generated by the furnace chamber, the product comprising a low temperature plasma that inhibits the formation of one or more of a dioxin, a furan, a nitrogen oxide, and a sulfur oxide, and transfer excess gas of the product to the heat exchanger. The heat exchanger is configured to cool the excess gas and transfer the cooled excess gas to the pollution control system. The pollution control system comprises a wet scrubber system configured to remove one or more of heavy metals and acid gases from the cooled excess gas to generate scrubbed excess gas, and a fixed bed coke system configured to detoxify the scrubbed excess gas by converting carbon monoxide, water, and steam in the scrubbed excess gas to carbon dioxide and hydrogen, and removing one or more of remaining acid gas, a remaining heavy metal, and a remaining dioxin from the scrubbed excess gas. The chimney configured to transfer remaining scrubbed excess gas that is detoxified out of the device. In one embodiment of the foregoing device, the ion generator comprises one or more magnets that are thermally decoupled from the furnace chamber and from conduits that provide the atmospheric air to the furnace chamber and the ion generator is configured to convert the atmospheric air by passing the atmospheric air through a magnetic field created by the one or more magnets. In another embodiment of the foregoing device, the one or more magnets are samarium cobalt magnets. In yet another embodiment of the foregoing device, the one or more magnets comprise two magnets that are stacked to generate a magnetic flux of approximately 500-600 Gauss. In yet another embodiment of the foregoing device, the magnetic field causes the decoupling of oxygen molecules from the atmospheric air into two oxygen atoms comprising the ionized gas before entering the furnace chamber. In yet another embodiment of the foregoing device, the ion generator comprises a variable frequency drive controller configured to control a flow of the atmospheric air circumferentially around a base of the furnace chamber. In yet another embodiment of the foregoing device, the furnace chamber comprises an operational waste access door that movably covers the furnace chamber and that is configured to receive the waste in a first amount for thermal decay thereof, and a secondary waste access door, smaller in size than the operational waste access door and located proximate to a base of the furnace chamber, that is configured to receive a portion of the waste in a second amount that is less than the first amount enabling initialization of a heat generation process subsequent to the waste in the second amount being loaded.

A method for processing waste is disclosed herein. The method comprises converting atmospheric air into an ionized gas, thermally decaying the waste by combining the waste with a product of an interaction of the ionized gas and heat generated by a furnace chamber, the product comprising a low temperature plasma that inhibits the formation of one or more of a dioxin, a furan, a nitrogen oxide, and a sulfur oxide, transferring excess gas of the product through a heat exchanger to cool the excess gas, transferring the cooled excess gas to a pollution control system to remove one or more of heavy metals and acid gases from the cooled excess gas to generate scrubbed excess gas, and to detoxify the scrubbed excess gas by converting carbon monoxide, water, and steam in the scrubbed excess gas to carbon dioxide and hydrogen and removing one or more of remaining acid gas, a remaining heavy metal, and a remaining dioxin from the scrubbed excess gas, and transferring remaining scrubbed excess gas that is detoxified out of the system. In an embodiment of the foregoing method, the converting comprises passing the atmospheric air through a magnetic field created by one or more magnets, the one or more magnets being thermally decoupled from the furnace chamber and from conduits that provide the atmospheric air to the furnace chamber. In yet another embodiment of the foregoing method, the one or more magnets are samarium cobalt magnets. In yet another embodiment of the foregoing method, the one or more magnets comprise two magnets that are stacked to generate a magnetic flux of approximately 500-600 Gauss. In yet another embodiment of the foregoing method, the magnetic field causes the decoupling of oxygen molecules from the atmospheric air into two oxygen atoms comprising the ionized gas before entering the furnace chamber. In yet another embodiment of the foregoing method, the method further comprises controlling a flow of the atmospheric air circumferentially around a base of the furnace chamber. In yet another embodiment of the foregoing method, the detoxifying the scrubbed excess gas includes passing the scrubbed excess gas across a pelletized catalyst in a fixed bed shelfing and tray enabling a low-temperature water gas shift, the pelletized catalyst comprising one or more of a copper oxide, a zinc oxide, or an aluminum oxide.

A device for processing waste is described herein. The device comprises a furnace chamber, an ion generator, and at least one blower, the ion generator comprising an enclosure adjacent to the base of the furnace chamber, and an outer housing, affixed to the furnace chamber, that comprises a first internal sliding plate and a second internal sliding plate, each having a respective, predetermined hole pattern therein, the first internal sliding plate being configured to move independently with respect to the second internal sliding plate via a slide mechanism, and the second internal sliding plate including one or more magnet retention holders positioned across the predetermined hole pattern such that a spacing between one or more magnets respectively retained therein is maintained, the at least one blower connected to the ion generator via one or more pipes and configured to drive atmospheric air through the one or more pipes into the enclosure of the ion generator, the ion generator configured to convert the atmospheric air into an ionized gas via interaction with a magnetic field generated by the one or more magnets, and provide the ionized gas to the furnace chamber, and the furnace chamber configured to thermally-decay the waste received therein by combining the waste with a product of an interaction between the ionized gas and heat generated by the furnace chamber in a low-temperature plasma reaction. In an embodiment of the foregoing device, the one or more magnets are rectangular ⅜" wide magnets. In yet another embodiment of the foregoing device, the one or more magnets are samarium cobalt magnets. In yet another embodiment of the foregoing device, the one or more magnets are positioned on the outlet of the blowers and external to openings into the furnace chamber. In yet another embodiment of the foregoing device, the one or more magnets are thermally decoupled from the furnace chamber and from conduits that provide the atmospheric air to the furnace chamber, and the ion generator is configured to convert the atmospheric air by passing the atmospheric air through a magnetic field created by the one or more magnets. In yet another embodiment of the foregoing device, the magnetic field causes the decoupling of oxygen molecules from the atmospheric air into two oxygen atoms comprising the ionized gas before entering the furnace chamber.

V. Conclusion

While various embodiments have been described above, it should be understood that they have been presented by way of example only, and not limitation. It will be apparent to persons skilled in the relevant art that various changes in form and detail can be made therein without departing from the scope of the embodiments. Thus, the breadth and scope of the embodiments should not be limited by any of the above-described exemplary embodiments, but should be defined only in accordance with the following claims and their equivalents.

What is claimed is:

1. A method for processing waste, comprising:
   converting atmospheric air into an ionized gas, wherein the converting comprises driving the atmospheric air via a blower through a magnetic field created by one or more magnets, the magnetic field causing the decoupling of oxygen molecules from the atmospheric air into two oxygen atoms comprising the ionized gas before entering a furnace chamber;
   thermally decaying the waste by combining the waste with a product of an interaction of the ionized gas and heat generated by the furnace chamber, the product comprising a low temperature plasma that reduces the formation of one or more of a dioxin, a furan, a nitrogen oxide, and a sulfur oxide;
   transferring excess gas of the product through a heat exchanger to cool the excess gas, the excess gas comprising a pollutant including one or more of the furan or the dioxin;
   transferring the cooled excess gas to a pollution control system;
   removing one or more of heavy metals and acid gases from the cooled excess gas to generate scrubbed excess gas, the acid gases comprising a sulfur dioxide;
   detoxifying the scrubbed excess gas by converting carbon monoxide, water, and steam in the scrubbed excess gas to carbon dioxide and hydrogen and removing one or more of remaining acid gas, a remaining heavy metal, and a remaining dioxin from the scrubbed excess gas; and
   transferring remaining scrubbed excess gas that is detoxified out of the system.

2. The method of claim 1, wherein the one or more magnets are thermally decoupled from the furnace chamber and from conduits that provide the atmospheric air to the furnace chamber.

3. The method of claim 2, wherein the one or more magnets are samarium cobalt magnets.

4. The method of claim 2, wherein the one or more magnets comprise two magnets that are stacked to generate a magnetic flux of approximately 500-600 Gauss.

5. The method of claim 1, wherein the method further comprises controlling a flow of the atmospheric air circumferentially around a base of the furnace chamber.

6. The method of claim 1, wherein said detoxifying the scrubbed excess gas includes passing the scrubbed excess gas across a pelletized catalyst in a fixed bed shelfing and tray enabling a low-temperature water gas shift, the pelletized catalyst comprising one or more of a copper oxide, a zinc oxide, or an aluminum oxide.

7. The method of claim 1, further comprising:

movably covering a furnace chamber with an operational waste access door that is configured to receive the waste in a first amount for thermal decay thereof, and receive a portion of the waste in a secondary waste access door in a second amount that is less than the first amount enabling initialization of a heat generation process subsequent to the waste in the second amount being loaded, the secondary waste access door smaller in size than the operational waste access door and located proximate to a base of the furnace chamber.

8. The method of claim 2, wherein the one or more magnets comprises a first magnet and a second magnet, wherein the north pole of the first magnet faces the south pole of the second magnet.

\* \* \* \* \*